United States Patent
Belaiche et al.

(10) Patent No.: US 6,876,637 B1
(45) Date of Patent: Apr. 5, 2005

(54) METHOD FOR RATE MATCHING BETWEEN DATA TRANSPORT CHANNELS AND CORRESPONDING DEVICE, BASE STATION AND MOBILE STATION

(75) Inventors: Vincent Antoine Victor Belaiche, Vitre (FR); David Dages, Breal Sous Montfort (FR)

(73) Assignee: Melco Mobile Communications Europe (MMCE), Cesson-Sevigne (FR)

( * ) Notice: Subject to any disclaimer, the term of this patent is extended or adjusted under 35 U.S.C. 154(b) by 959 days.

(21) Appl. No.: 09/676,984

(22) Filed: Oct. 2, 2000

(30) Foreign Application Priority Data

Oct. 4, 1999 (FR) ............................................. 99 12722

(51) Int. Cl.$^7$ ................................................. H04J 3/02
(52) U.S. Cl. ........................ 370/329; 370/329; 370/537; 455/552.2
(58) Field of Search ................................. 370/329, 320, 370/310, 314, 324, 336, 341, 347, 468, 498, 537, 252; 455/450, 451, 452.1, 552.2, 453

(56) References Cited

U.S. PATENT DOCUMENTS 6,363,058 B1 * 3/2002 Roobol et al. ............... 370/310
6,473,442 B1 * 10/2002 Lundsjo et al. ............. 370/537

FOREIGN PATENT DOCUMENTS

EP 0 917 321 5/1999

* cited by examiner

Primary Examiner—William Luther
(74) Attorney, Agent, or Firm—Oblon, Spivak, McClelland, Maier & Neustadt, P.C.

(57) ABSTRACT

This invention relates to a method for rate matching between at least two transport channels included within a composite channel. An object of this method is to minimize the number of the DTX symbols inserted the composite channel. This method comprises a rate matching step for each transport channel (i), a rate matching ratio ($RF_i$) being applied to each transport channel. The inventive method comprises a step (301) for defining, for said composite channel, a ordered list of transport channels, a step (302) for determining at least two so-called global intervals for said ordered list of transport channels, and a step (303) for assigning a scale factor (LF) to each determined global interval.

10 Claims, 9 Drawing Sheets

METHOD FOR RATE MATCHING BETWEEN DATA TRANSPORT CHANNELS AND CORRESPONDING DEVICE, BASE STATION AND MOBILE STATION

This invention relates to a method for rate matching between at least two transport channels included within a composite channel, said method comprising at least one rate matching step for each transport channel, a rate matching ratio being applied to each transport channel, said rate matching ratio being equal to the product of a rate matching factor specific to said transport channel and a scale factor, said scale factor being common to the set of said transport channels of said composite channel, each of said transport channels being transmitted for at least one associated transmission time interval, each of said transmission time intervals having a duration specific to each of said transport channels, at least two of said transport channels having transmission time intervals of distinct duration. This invention is implemented in particular in the field of third generation telecommunication systems for mobiles.

The 3rd Generation Partnership Project is an organization whose purpose is the standardization of a third generation telecommunication system for mobiles. The technology considered for such systems is the CDMA (Code Division Multiple Access) technology. One of the fundamental aspects distinguishing third generation systems from second generation ones is that, in addition to making more efficient use of the radio spectrum, they provide very good service flexibility.

One of the issues of third generation mobile radio systems is to efficiently multiplex at the radio interface services not having the same requirements in terms of quality of service (QoS). Such differences in quality of service imply in particular using respective transport channels with different channel coding and interleaving and also require different bit error rates (BER) for each transport channel. For a given channel coding, the bit error rate is sufficiently low when all coded symbols have a sufficiently high Eb/I ratio. The Eb/I ratio is the ratio of the average energy of each coded bit (Eb), and the average interference energy (I). In addition, the relationship providing the bit error rate obtained depending on the incoming Eb/I ratio depends on the coding.

It is recalled that the term symbol designates a piece of information that can have a finite number of values within a given alphabet. E.g., a symbol that can have two values is the same as a bit in terms of information.

Consequently, the different services, not having the same quality of service, do not have the same requirements in terms of the Eb/I ratio. And yet, in a CDMA-type system, the system's capacity is limited by the interference level. Thus, an increase in energy per bit of coded symbols for one user (Eb) contributes to an increase in interference (I) for the other users. Therefore, the Eb/I ratio must be set precisely for each service in order to limit interference generated by this service. An Eb/I ratio balancing operation between the different services is then required.

Therefore, it is envisaged to balance the Eb/I ratio among the different services. This balancing is done at transmission by rate matching of the coded transport channels transporting different services. Rate matching either consists in repeating symbols (rate matching ratio greater than one), or in puncturing symbols (rate matching ratio less than one). When rate matching is done, at transmission, by repeating certain symbols, then, for each repeated symbol, a set is formed grouping the positions where the symbol is located after repetition.

Also, when rate matching is done, at transmission, by puncturing certain symbols, then, a set is formed grouping the positions where a symbol has been removed.

When the transport channels rate matched by repetition or puncturing are received, a reverse operation, called de-rate matching, is performed. In case the transport channels are rate matched by repetition, the amplitudes of the repeated symbols received are added, in order to form, after de-rate matching, a single symbol. The amplitude of this single symbol is then equal to the sum of the amplitudes of the repeated symbols.

In case the transport channels are rate matched by puncturing, zero amplitude symbols are inserted, after de-rate matching, among the symbols received so that after this insertion, they are located at the symbol positions indicated by the set.

The same rate matching ratio applies to sending and receiving. Upon transmission, the rate matching ratio, except for rounding, is equal to the ratio of the rate matched block size to the corresponding block size to be rate matched. Upon receipt, the rate matching ratio, except for rounding, is equal to the ratio of the block size before de-rate matching to the corresponding block size obtained after de-rate matching.

In the OSI (Open System Interconnection) model of the ISO (International Standardization Organization), a telecommunication equipment is modeled by a layer model constituting a protocol stack wherein each layer is a protocol providing a service to the higher level layer. In the system of the 3GPP group, the service provided by the level 1 layer to the level 2 layer is called "transport channels". A transport channel can therefore be understood as a data flow between the level 1 and level 2 layers of the same equipment. A transport channel (abbreviated as TrCH) enables the level 2 layer to transmit data with a certain quality of service. This quality of service depends on the channel coding and interleaving used. A transport channel can also be understood as a data flow between two level 2 layers of two separate equipments connected via a radio link.

Described hereafter is the known data processing technique in the downlink of the system of the 3GPP group with reference to FIGS. 1 and 2.

The transmission chain of a composite channel for a downlink of a third generation telecommunication system, such as defined by the 3GPP group, is shown in FIG. 1.

For each transport channel with its own quality of service, referenced as 100, a higher level layer 101 periodically supplies the level 1 layer with a transport block set. The periodical time interval, at which the transport block set is supplied to the transport channel, is called hereafter transmission time interval or TTI interval of the transport channel. Each transport channel has a TTI interval duration of its own. The duration of the TTI intervals can be 10, 20, 40 or 80 ms.

An example of transport channels A, B, C, and D, respectively having TTI interval duration of 80 ms, 40 ms, 20 ms and 10 ms is shown in FIG. 2. In this figure, the transport block set received by each transport channel is represented by a bar chart bar. The length of bar chart bar represents a TTI interval of the associated transport channel and its surface corresponds to the payload of the transport block set. The horizontal dotted lines in the bar chart bars define the transport block(s) included in each transport block set. Thus, transport channel A receives, during a first transmission time interval, a first transport block set marked $A_0$ comprising 3 transport blocks, and during the subsequent TTI interval, a second transport block set marked $A_1$ comprising no transport block at all. Also, transport channel B receives the transport block sets marked $B_0$, $B_1$, $B_2$ and $B_3$ during four consecutive TTI intervals, comprising respectively 1, 2, 0, and 3 transport blocks. Transport channel C receives the transport block sets marked $C_0$ to $C_7$ during eight successive TTI intervals, and finally, transport channel D receives the transport block sets marked Do to $D_{15}$ during sixteen TTI intervals.

It should be noted that a TTI interval of a given transport channel cannot overlap two TTI intervals of another transport channel. This is enabled due to the possible duration of TTI intervals increasing geometrically (10 ms, 20 ms, 40 ms and 80 ms). In addition, the transport format designates information representing the number of transport blocks contained in the transport block set received by a transport channel and their respective sizes. For a given transport channel, there is a finite set of possible transport formats one of which is selected at each TTI interval depending on the requirements of the higher level layers. For a constant bit rate transport channel, this set only comprises one element. In this figure, the transport format of the transport channels is indicated by a number. Thus, for the first TTI of transport channel A extending over frames 0 to 7, the transport format is identified by number 2. For the TTI interval of transport channel D corresponding to the radio frame numbered 3, the transport format is identified by number 3.

In addition, a radio frame designates a periodical time interval numbered and synchronized according to a signal broadcast by the network. The duration of a radio frame is 10 ms in the system of the 3GPP group. In the example of FIG. 2, transport channel A has a first transport format for set $A_0$ received during the radio frames numbered 0 to 7, and a second transport format for set $A_1$ during the radio frames numbered 8 to 15. Thus, the TTI intervals of transport channel A coincide with eight successive radio frames, whereas those of transport channel D each coincide with a single radio frame.

Hereafter, the expression transport format combination designates information defining, for each multiplexing frame, the transport formats associated with each transport channel, the term multiplexing frame designating a data block generated periodically, e.g. at each radio frame, and comprising data from the set of transport channels. Thus, with reference to FIG. 2, the time intervals associated with multiplexing frames being radio frames, the transport format combination for the radio frame numbered 5 designates, respectively for transport channels A, B, C, and D, the transport formats respectively associated with the transport block sets referenced as $A_0$, $B_1$, $C_2$, and $D_5$. The transport format combination for this radio frame is ((A,2), (B,1), (C,1), (D,0)).

Referring again to FIG. 1, each transport channel, referenced as 100, receives at each associated TTI interval, a transport block set from a higher level layer 101. The transport channels with different qualities of service are processed by associated processing chains referenced as 102A, 102B. A frame check sequence FCS is attached to each of these blocks during a step referenced as 104, in order to form FCS sequence transport blocks. Such sequences are used upon receipt to detect whether the transport block received is correct or corrupted. It should be noted that the FCS sequence may have a zero size when error detection is not required. The next step, referenced as 106, consists in forming a set of blocks to be coded from the set of FCS sequence transport blocks. This step 106 typically consists in concatenating FCS transport blocks with each other in order to form a single data block. This single block constitutes a block to be coded, when its size is less than a certain limit depending on the type of channel coding, otherwise this single block is segmented into a set of identically sized blocks to be coded, so that the size of each of them does not exceed the maximum size of the channel encoder under consideration. The next step referenced as 108 consists in performing channel encoding for the sets of blocks to be encoded. Thus, after this step 108, a set of coded blocks is obtained at each TTI interval. Typically, each block to be coded of the same set is coded separately, and the resulting blocks are concatenated with each other, to form a single coded block per set of blocks to be coded. A coded block can therefore correspond to several transport blocks. Just as a series of transport block sets constitutes a transport channel, a series of coded blocks is called a coded transport channel.

The coded transport channel is first rate matched in the step referenced as 116, then, in order to obtain a fixed position of the transport channel, dummy symbols, also called DTX symbols, are inserted in the step referenced as 118, then the transport channel is interleaved in the step referenced as 120 and finally segmented per multiplexing frame in the step referenced as 122. Step 122 of segmenting per multiplexing frame is required because prior to it, the steps are carried out TTI interval by TTI interval. And yet, different transport channels can have different TTI interval duration. Therefore, for carrying out the next step 124 of multiplexing the different transport channels, it is necessary to come down to a common period, the duration of which is a common divisor of the TTI interval duration. This common period corresponds to the period of a multiplexing frame and typically amounts to 10 ms. Thus, if the TTI interval duration of a transport channel i is a multiple of the common period according to a ratio designated as $F_i (F_i \in \{1, 2, 4, 8\})$, step 122 of segmenting the transport channel i segments any block having a size n into $F_i$ segments having a size of $$\left\lceil \frac{n}{F_i} \right\rceil$$

or $$\left\lfloor \frac{n}{F_i} \right\rfloor,$$

each of them being transmitted in one multiplexing frame. It should be noted that $\lceil x \rceil$ et $\lfloor x \rfloor$ respectively designate the smallest integer greater than or equal to x and the largest integer less than or equal to x. The multiplexing frame is the data block produced by step 124 of block segment multiplexing. This multiplexing step 124 is carried out typically through concatenation. The flow of multiplexing frames makes up a composite channel. As the rate of multiplexed transport channels may vary, the bit rate of the composite channel obtained after multiplexing step 124 also varies.

When at least one transport channel is in a flexible position, DTX symbols are inserted in a subsequent step referenced as 126.

The capacity of a physical channel being limited, it may happen that the number of physical channels required for conveying this composite channel is greater than one. In this case, a step 128 of segmenting this composite channel is provided. For two physical channels PhCH#1 and PhCH#2, this segmenting step 128 for instance consists in sending the first half of symbols of the multiplexing frame to physical channel PhCH#1 and the second half to physical channel PhCH#2.

The data segments obtained are then interleaved in a step referenced as 130, then positioned on the physical channel corresponding to step 132. This final step 132 consists in modulating transmitted symbols through spectrum spreading.

It is recalled that DTX symbols are dummy symbols that carry no information at all, and subsequently to step 132 of placing them on the physical channel, have no energy. A DTX symbol can therefore be construed as indicating discontinuous transmission. The step of inserting DTX symbols in the downlink is carried out TTI interval by TTI interval in the step referenced as 118, and/or multiplexing frame by multiplexing frame in the step referenced as 126. Inserting DTX symbols is necessary because the bit rate of the composite channel may vary. As for the bit rate supplied to the composite channel by the physical channel(s), it is fixed. Therefore, a sufficient number of DTX symbols should be inserted to complete the multiplexing frames so that the total number of symbols, including DTX symbols, is the same as the total number $N_{data}$ of available symbols provided by the radio frame, for transmission, to the composite channel through the physical channel(s). This total number $N_{data}$ of symbols per radio frame is also called available bit rate and depends on the number of physical channels allocated as well as on their spreading factor. This total number $N_{data}$ corresponds to the maximum number of symbols that the composite channel can contain in one multiplexing frame considering the available bit rate provided by the physical channel(s). When the transport channel involved is in a fixed position, then, in the step referenced as 118, a sufficient number of DTX symbols are inserted for the data flow to have constant bit rate after this step 118 (including, in addition to the data obtained after the rate matching step 116, the inserted DTX symbols in the transport channel), and this whatever the transport format of the transport channel involved. Thus, detecting the transport format of the transport channel involved can be performed blindly with reduced complexity. Indeed, the reverse operations of multiplexing, segmentation per multiplexing frame, interleaving, and rate matching, can be performed in principle on the transport channel involved without its transport format having to be known (in particular when the transport channel involved is in a fixed service position). The transport format is then detected at channel decoding level, which is the reverse operation of channel encoding 108. When at least one transport channel is in a flexible position, then the DTX symbols required for completing the multiplexing frame are inserted in the step referenced as 126. With this technique, the position of each transport channel in the multiplexing frame is said to be flexible, because each transport channel occupies a variable space in the multiplexing frame. Thus, the space not used by one transport channel, when transmitting less data, can be used by another transport channel. So, the capacity of the physical channel(s) is better used. On the other hand, flexible positions require transmission of an explicit indication of the current transport formats, for each multiplexing frame, in a physical control channel separate from the physical channels carrying the composite channel. The fixed position technique has the advantage that it does not require the transmission of an explicit indication on current transport formats.

As mentioned above, the rate matching step 116 is meant to balance the Eb/I ratio between the coded transport channels with different qualities of service. The incoming bit error rate BER depends on this Eb/I ratio. Indeed, for a channel decoder performing a decoding operation corresponding to the reverse operation of encoding (in comparison with the step referenced as 108), the higher the Eb/I ratio at the decoder input, the lower the output bit error rate.

During the rate matching step 116, a $RF_i$ rate matching ratio is applied to each transport channel i. This ratio is defined as follows: considering a type k block produced by transport channel i with a symbol count $X_k$ before rate matching and a symbol count $Y_k$ after rate matching, then $Y_k$ is such that the rate matching ratio $RF_i$ is, except for rounding, the same as the ratio $$\frac{Y_k}{X_k}.$$

After the rate matching step 116, the Eb/I ratio has then been multiplied by the rate matching ratio $RF_i$.

Balancing the Eb/I ratio only establishes the proportion between the respective rate matching ratios $RF_i$ of the various coded transport channels. It does not enforce the absolute value of rate matching ratio $RF_i$. Thus, the set of rate matching ratios $RF_i$ of the coded transport channels is determined, except for a multiplying coefficient, hereafter called scale factor LF. The lower limit of the rate matching ratio $RF_i$ is established by the maximum puncturing rate $P_i$ that the coded transport channel i can support, i.e.:

$$RF_i \geq 1-P_i, \quad (1)$$

and its upper limit is established by the available bit rate $N_{data}$. It is recalled that the available bit rate $N_{data}$ is the maximum number of symbols available for one multiplexing frame considering the limits of the allocated physical resources.

In addition, the rate matching ratio $RF_i$ can be written as:

$$RF_i = LF \cdot RM_i \quad (2)$$

where:

the set $\{RM_i\}$ is such that the proportions between the different rate matching factors $RM_i$ correspond to the desired proportions between the Eb/I ratios of the incoming coded transport channels obtained. The rate matching factors $RM_i$ do not take into account the lower and upper limits imposed on the rate matching ratios $RF_i$, respectively by the maximum puncturing rates $P_i$ specific to transport channels and by the available bit rate $N_{data}$; and LF is the scale factor; it is the same for all coded transport channels; furthermore, it is determined when the composite channel is formed, so that the number of DTX symbols to be inserted is at a minimum when the composite channel bit rate is highest.

It will now be described how the scale factor LF is determined in prior art.

TFCS hereafter designates the set of transport format combinations. This set is finite because the number I of transport channels included in the composite channel is finite, moreover, each of them being only capable of having a finite number of transport formats. It should be noted that randomly choosing a transport format for each transport channel does not necessarily produce a combination of transport formats. Indeed, the combinations of transport formats in the TFCS set take into account in particular the available bit rate ($N_{data}$).

In addition, for any combination j of transport formats in the TFCS set, MSB(j) designates a set of coded block types for this combination of transport formats. A coded block type designates a piece of information defining:

- the transport channel that has produced the coded block under consideration,
- the transport format for which the coded block under consideration has been produced, and
- a sequence number representing the position of the coded block under consideration in the series of coded blocks produced by the transport channel for the corresponding transport format, when several coded blocks are produced for this transport format.

It can then be understood that, a transport format combination defining a transport format for any transport channel, MSB(j) can be defined. In addition, k being a coded block type, I(k) designates the transport channel producing type k coded blocks and $X_k$ and $Y_k$ the size of the type k block before and after the rate matching step 116.

Thus, in prior art, the scale factor LF is defined once for the set of transport channels of the composite channel by the formula (3) below so as to minimize the number of DTX symbols to be inserted (126) at maximum bit rate of the composite channel:

$$LF = \frac{N_{data}}{\max_{j \in TFCS} \left( \sum_{k \in MSB(j)} RM_{I(k)} \cdot \frac{X_k}{F_{I(k)}} \right)} \quad (3)$$

This formula (3) is obtained as follows: if, for any transport format combination j, D(j) designates the size of the corresponding multiplexing frame and $\hat{D}(j)$ an estimator of D(j), then $\hat{D}(j)$ is given by the following formula (4):

$$\hat{D}(j) = \sum_{k \in MSB(j)} RF_{I(k)} \cdot \frac{X_k}{F_{I(k)}} \quad (4)$$

Minimizing the number of DTX symbols to be inserted (126) when composite channel bit rate is highest, then is the same as writing the following formula (5):

$$\max_{j \in TFCS} \hat{D}(j) = N_{data} \quad (5)$$

and equation (3) results from solving equation (5). It should be noted that D(j) and $\hat{D}(j)$ respectively correspond to the bit rate of the composite channel and its estimator, when the composite channel bit rate is expressed as the number of symbols per radio frame. To solve (5), all that is required is to replace $\hat{D}(j)$ by its expression (4), and in this expression to replace $RF_{I(k)}$ by its expression $LF \cdot RM_{I(k)}$. It then appears that the estimator $\hat{D}(j)$ is the product of the scale factor LF and a normalized estimator DN(j) of the composite channel (when the scale factor LF is 1) given by the formula (6) below $$DN(j) = \sum_{k \in MSB(j)} RM_{I(k)} \cdot \frac{X_k}{F_{I(k)}} \quad (6)$$

Formula (3) can then be written as:

$$LF = \frac{N_{data}}{\max_{j \in TFCS} DN(j)}.$$

However, this known solution has a major drawback. Indeed, it attempts to minimize the insertion of DTX symbols as the transmit power varies largely between transmitting a DTX symbol (zero power) and transmitting a real symbol (non-zero power). As a result the peak to average radio frequency power ratio increases as the proportion of inserted DTX symbols rises. And yet, the construction of a radio frequency amplifier is simpler when the peak to average radio frequency power ratio is low.

In particular, it is an object of the invention to compensate for the above-mentioned major drawback.

More particularly, the main object of this invention is to provide a rate matching method allowing to increase the minimization of the number of inserted DTX symbols, in comparison with the known solution, in particular for certain sets of transport format combinations.

According to the invention, this main object, as well as others that will be apparent later on, are achieved by a rate matching method between at least two transport channels included within a composite channel, said method comprising at least one rate matching step for each transport channel, a rate matching ratio being applied to each transport channel, said rate matching ratio being equal to the product of a rate matching factor specific to said transport channel and a scale factor, said scale factor being common to the set of said transport channels of said composite channel, each of said transport channels being transmitted for at least one associated transmission time interval, each of said transmission time intervals having a duration specific to each of said transport channels, at least two of said transport channels having transmission time intervals of distinct duration, characterized in that it comprises successive steps of:

defining, for said composite channel, a list of at least two transport channels ordered in descending order of the duration of their respective transmission time interval, said ordered list of transport channels being able to include at least one transport channel not transporting any data for at least one associated transmission time interval, determining, for said composite channel, at least two so-called global intervals for said ordered list of transport channels, said determined global intervals following each other in time, each of said determined global intervals corresponding:

either to a transmission time interval associated with the first transport channel of said ordered list conveying data for said associated transmission time interval, or, in case none of the transport channels of said ordered list is transporting any data, to the smallest transmission time interval, assigning a scale factor to each determined global interval, said scale factor being constant for the duration of each determined global interval, at least two assigned scale factors having distinct values for at least two global intervals.

According to the invention, in order to minimize the number of inserted DTX symbols, the scale factor LF may vary not only when the normalized estimator DN(j) of the composite channel bit rate is at a maximum for all transport format combinations, but also when the normalized estimator DN(j) is at a maximum for part of the transport format combinations. Thus, the number of inserted DTX symbols is minimized more often than with prior art.

To this end, for minimizing the number of zero energy contribution symbols (DTX), the value of each of said assigned scale factors is determined according to the following formula:

$$LFG_p = \frac{N_{data}}{\max_{j \in TFCSG(p)} \left( \sum_{k \in MSB(j)} RM_{I(k)} \cdot \frac{X_k}{F_{I(k)}} \right)}$$

$N_{data}$ being said maximum bit rate supplied to said composite channel by said at least one physical channel;

k being a coded block type;

I(k) being a transport channel generating type k coded blocks;

$X_k$ being the number of symbols of said transport channel generating type k coded blocks before said rate matching step;

$F_{I(k)}$ being the duration of said transmission time interval of said transport channel generating type k coded blocks;

MSB(j) being the set of coded block types for the transport format combination j; and TFCSG(p) being the set of transport format combinations defining the same transport formats as a partial combination p of transport formats of the transport channels having transmission time intervals with duration lower than or equal to that of said determined global interval.

According to another embodiment, the method further comprises the following successive steps of:

defining a sub-list of at least one transport channel, said sub-list including the set of transport channels of the ordered list from the first transport channel to a given transport channel, said sub-list being ordered in descending order of the duration of the transmission time interval associated with each of said at least one transport channel of the sub-list, and substituting said sub-list to said ordered list, in order to reduce, for said composite channel, the number of scale factor values to be assigned to the set of said determined global intervals.

This rate matching method is implemented advantageously within a telecommunication system using a CDMA type multiple access technology from a radio access network comprising at least one base station to at least one mobile station of said telecommunication system.

If the method comprises a step of defining a sub-list of at least one transport channel, said at least one transport channel of the sub-list is selected by said radio access network of said telecommunication system.

Another subject of the invention is a device for rate matching between at least two transport channels included within a composite channel, said device comprising at least rate matching means for each transport channel, a rate matching ratio being applied to each transport channel, said rate matching ratio being equal to the product of a rate matching factor specific to said transport channel and a scale factor, said scale factor being common to the set of said transport channels of said composite channel, each of said transport channels being transmitted for at least one associated transmission time interval, each of said transmission time intervals having a duration specific to each of said transport channels, at least two of said transport channels having transmission time intervals of distinct duration, characterized in that it comprises:

means for defining, for said composite channel, a list of at least two transport channels ordered in descending order of the duration of their respective transmission time interval, said ordered list of transport channels being able to include at least one transport channel not transporting any data for at least one associated transmission time interval, means for determining, for said composite channel, at least two so-called global intervals for said ordered list of transport channels, said determined global intervals following each other in time, each of said determined global intervals corresponding:
either to a transmission time interval associated with the first transport channel of said ordered list conveying data for said associated transmission time interval,
or, in case none of the transport channels of said ordered list is transporting any data, to the smallest transmission time interval, means for assigning a scale factor to each determined global interval, said scale factor being constant for the duration of each determined global interval, at least two assigned scale factors having distinct values for at least two global intervals.

Another subject of the invention is a base station of a telecommunication system comprising transmission means of at least two transport channels and a device as defined above.

Another subject of the invention is a device for de-rate matching between at least two transport channels included within a composite channel, said device comprising at least de-rate matching means for each transport channel, a rate matching ratio being applied to each transport channel, said rate matching ratio being equal to the product of a rate matching factor specific to said transport channel and a scale factor, said scale factor being common to the set of said transport channels of said composite channel, each of said transport channels being transmitted for at least one associated transmission time interval, each of said transmission time intervals having a duration specific to each of said transport channels, at least two of said transport channels having transmission time intervals of distinct duration, characterized in that it comprises:

means for defining, for said composite channel, a list of at least two transport channels ordered in descending order of the duration of their respective transmission time interval, said ordered list of transport channels being able to include at least one transport channel not transporting any data for at least one associated transmission time interval, means for determining, for said composite channel, at least two so-called global intervals for said ordered list of transport channels, said determined global intervals following each other in time, each of said determined global intervals corresponding:
either to a transmission time interval associated with the first transport channel of said ordered list conveying data for said associated transmission time interval,
or, in case none of the transport channels of said ordered list is transporting any data, to the smallest transmission time interval, means for assigning a scale factor to each determined global interval, said scale factor being constant for the duration of each determined global interval, at least two assigned scale factors having distinct values for at least two global intervals.

Finally, another subject of the invention is a mobile station of a telecommunication system comprising means for receiving at least two transport channels and a de-rate matching device such as defined above.

Other features and advantages of the invention will be apparent from reading the following description of two preferred embodiments of the invention, by way of example only and not to be restrictive, with reference to the accompanying drawings, wherein:

FIG. 1, already described in the preamble, is a simplified flow chart of a known data processing technique for transmitting a composite channel over the downlink;

FIG. 2, already described in the preamble, shows four timing charts of a first traffic example of four transport channels represented by their transport block sets, the transport channels being included in the same composite channel;

Figure 3:
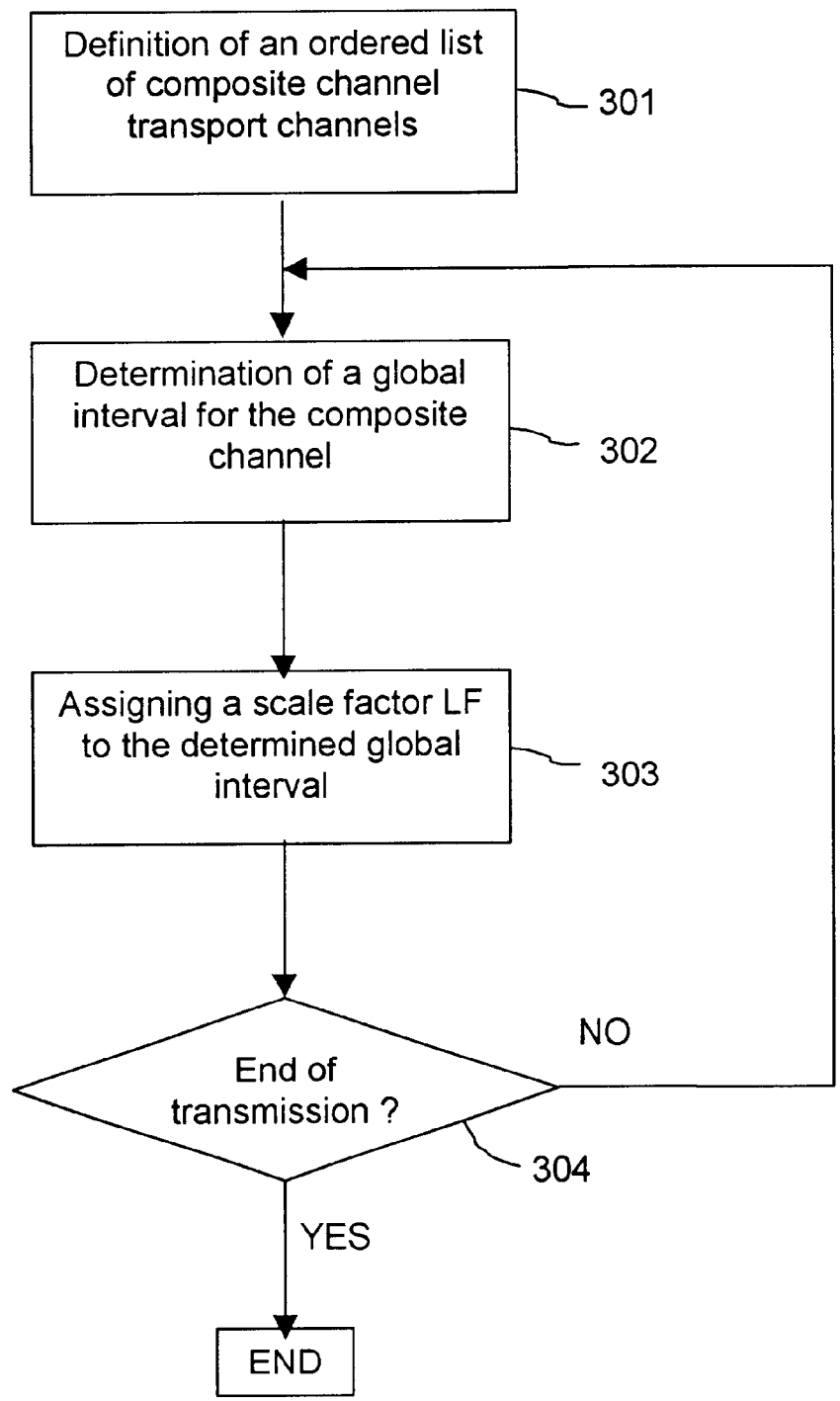
FIG. 3 is a simplified flow chart of a first embodiment of the rate matching method according to the invention.

According to a first embodiment, a list is established comprising the set of transport channels of the composite channel by sequencing them in descending order of their respective TTI interval duration. This ordered list may be truncated, i.e. that only the n first transport channels of the list are maintained together with their sequence in a sub-list, for a given non-zero number n of transport channels. Establishing a sub-list is treated by a second embodiment to be described later on. The steps of the first embodiment are illustrated in FIG. 3. In a step referenced as 301, an ordered list of transport channels of the composite channel is defined as specified previously. Then, in a step referenced as 302, a global interval is determined. This step is reiterated once a scale factor has been assigned to this global interval in a step referenced as 303 until the end of the transmission referenced by a step 304. A series of global intervals is thus determined.

The global intervals are defined as follows:
a) The transmission start time for a given channel is considered. For all transport channels, this time is also the start time of its first associated TTI interval.
b) For the time under consideration, the list is then scanned from the first transport channel on until a transport channel is found that transmits a non-zero data amount during its TTI interval starting at the time under consideration. If such a transport channel is found, then the new global interval coincides with the TTI interval of the transport channel of the list starting at the time under consideration. If such a transport channel is not found in the list, i.e., if simultaneously no transport channel of the list is transmitting data, then the global interval coincides with the TTI interval of the last transport channel of the list starting at the time under consideration.
c) A global interval having thus been determined, the end time of this global interval is considered, and step b) is repeated iteratively, for this new time under consideration, in order to determine the next global interval. Thus, one by one, the set of global intervals, and consequently of corresponding scale factors, is determined for the composite channel under consideration.

Figure 1:
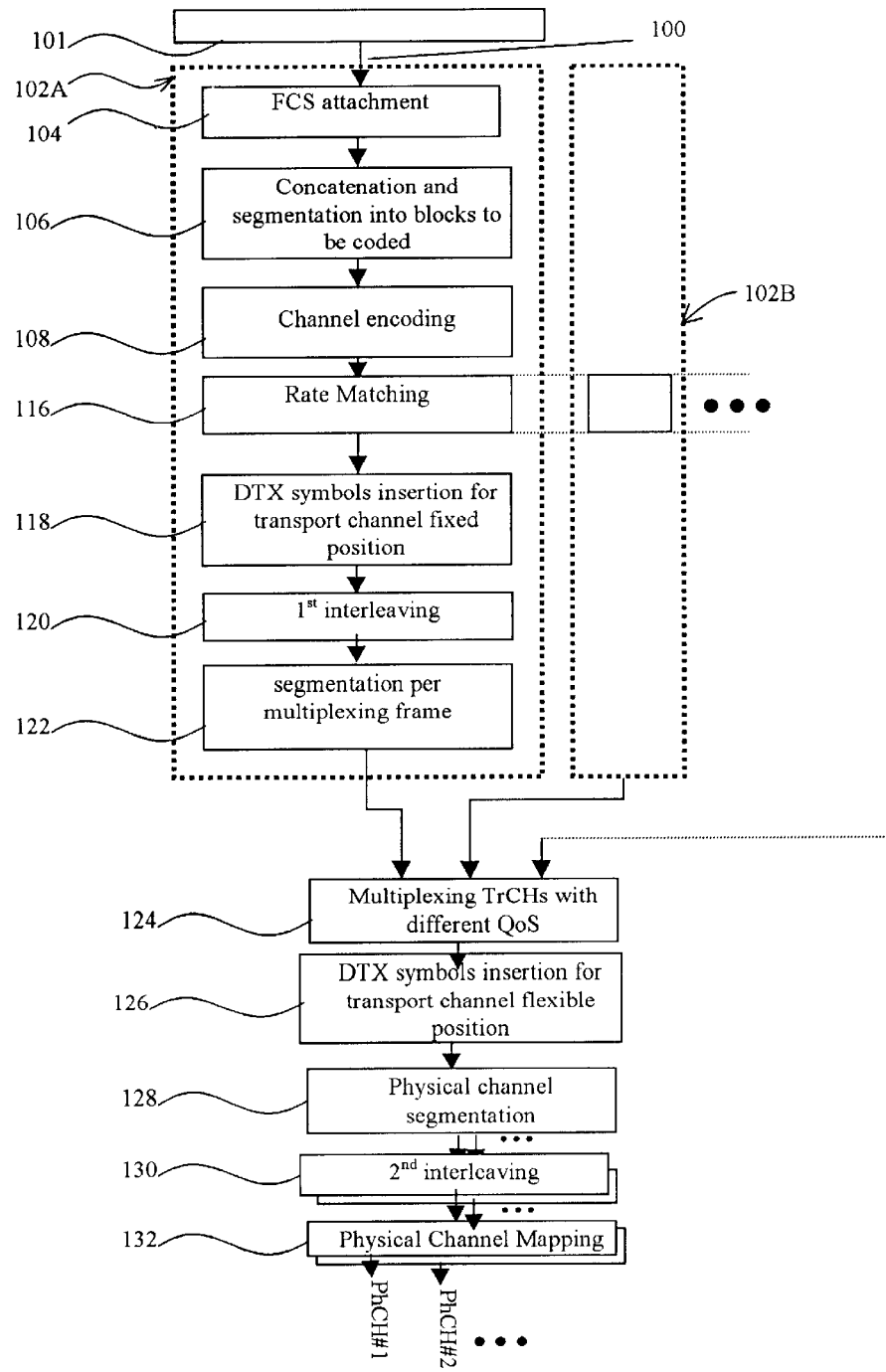
Figure 2:
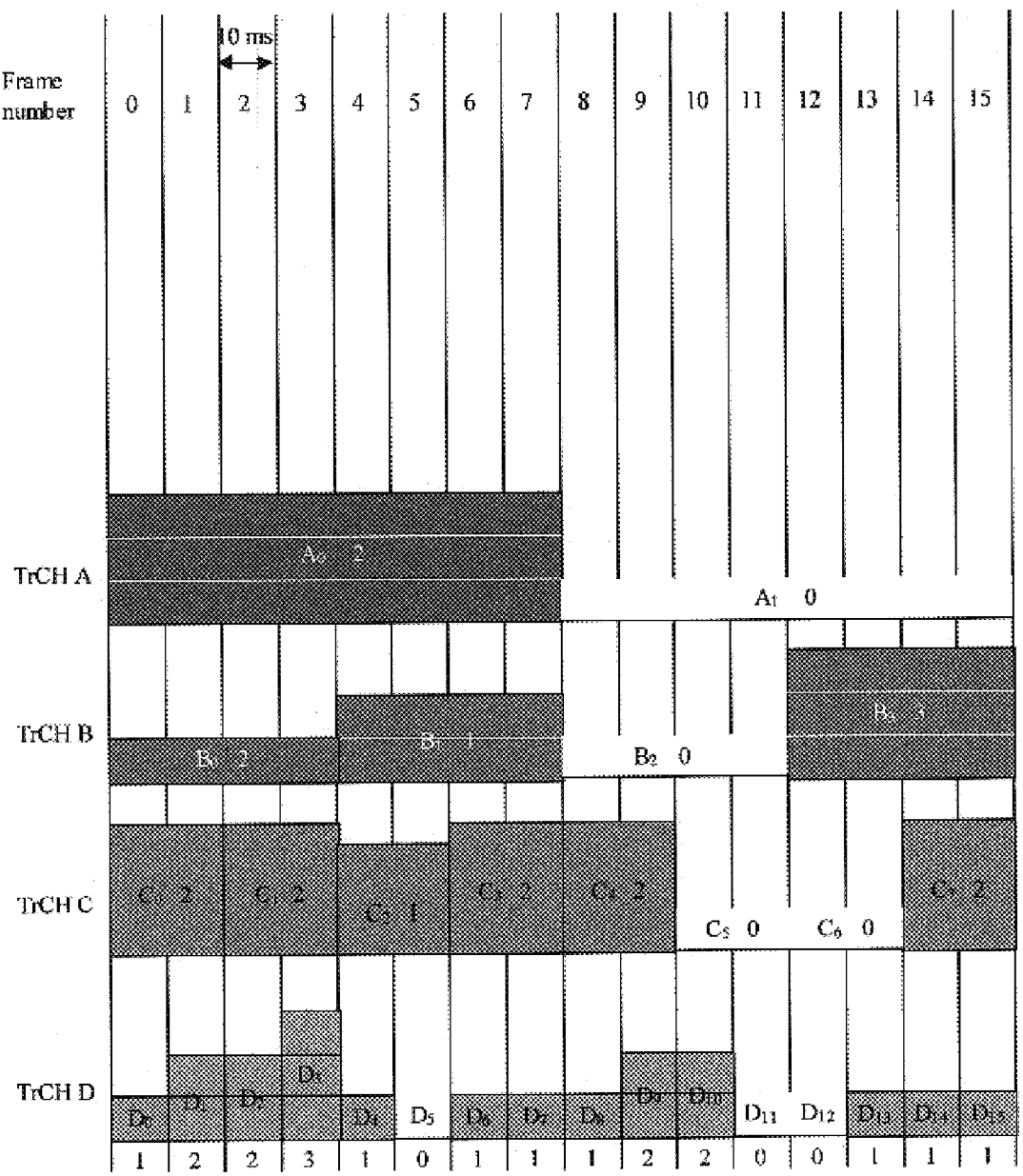
Figure 4:
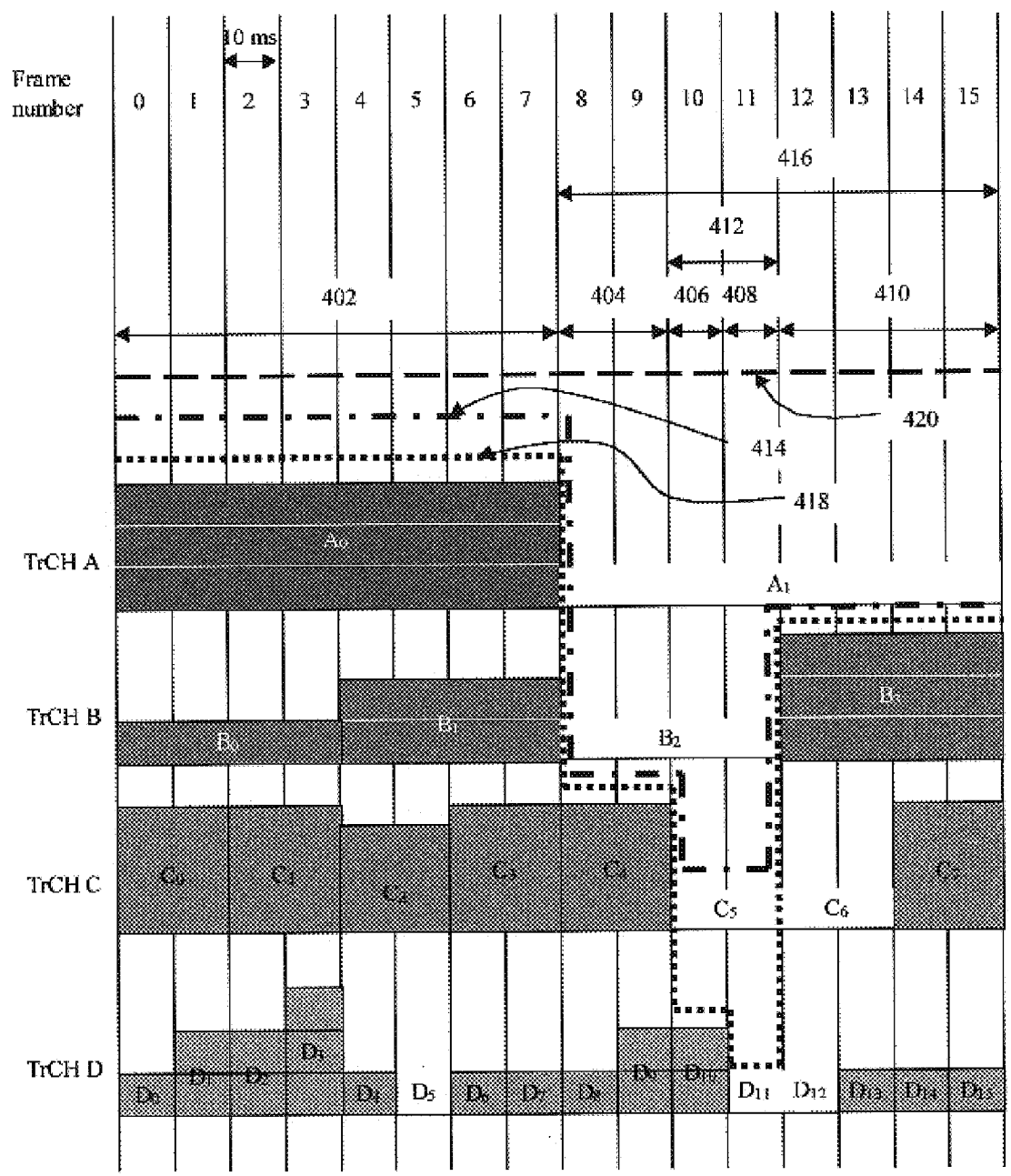
FIG. 4 shows the global intervals of the transport channels of FIG. 2 for different embodiments of the invention.

This step 302 is also illustrated by FIG. 4 that shows the global intervals for the composite channel comprising transport blocks A, B, C and D of FIG. 2. The ordered list corresponding to the transport channels of FIG. 2 is marked (A, B, C, D).

For this example, the successive global intervals are determined by following the line referenced as 418 as a dotted line of FIG. 4. At the start time of the frame numbered 0, the first transport channel of the ordered list transmitting a non-zero data amount, is transport channel A. The first global interval then coincides with the TTI interval referenced as 402 of transport channel A. At the next time under consideration (namely the end time of the first global interval), i.e. at the start time of the frame numbered 8, the first transport channel of the ordered list transmitting a non-zero data amount is transport channel C. The second global interval then coincides with the TTI interval referenced as 404 of transport channel C. At the next time under consideration (namely at the end time of the second global interval), i.e. at the start time of the frame numbered 10, the first transport channel transmitting a non-zero data amount is transport channel D. The first global interval is then the TTI interval referenced as 406. At the next time under consideration (namely at the end time of the third global interval), i.e. at the start time of the frame numbered 11, no transport channel is transmitting any data, so the fourth global interval coincides with the TTI interval referenced as 408 of the last transport channel of the list, namely transport channel D. At the next time under consideration (namely at the end time of the fourth global interval), i.e. at the start time of the frame numbered 12, the first transport channel transmitting a non-zero data amount, is transport channel B. The next fifth global interval is then the TTI interval referenced as 410.

In step 303 of FIG. 3, a scale factor LF is assigned to each global interval. This scale factor is constant for the whole duration of the global interval.

In order to determine the value of the scale factor, for each global interval, a transport channel set MG grouping the transport channels of the ordered list is defined, the TTI interval duration of which is at least the same as of the global interval under consideration. It should be noted that the transport channel set MG may vary depending on the global interval under consideration. A partial combination of transport formats can then be defined as the information defining the respective transport formats of each transport channel in the set MG. Assuming that the transport format ID numbers are as in FIG. 2, then the partial transport format combina tions associated with global intervals are as follows, the ordered list being (A,B,C,D):

| Global interval reference | Partial combination of transport format(s) |
|---|---|
| 402 | ((A, 2)) |
| 404 | ((A, 0), (B, 0), (C, 2)) |
| 406 | ((A, 0), (B, 0), (C, 0), (D, 2)) |
| 408 | ((A, 0), (B, 0), (C, 0), (D, 0)) |
| 410 | ((A, 0), (B, 3)) |

For each partial transport format combination p, a part marked TFCSG(p) of the TFCS set comprising all transport format combinations including the partial combination p can be defined.

Referring again to FIG. 2 or 4, the following is obtained, e.g.:

TFCS =
{((A, 0), (B, 0), (C, 0), (D, 0)), ((A, 0), (B, 0), (C, 0) (D, 2)), (7)
((A, 0), (B, 0), (C, 2), (D, 1)), ((A, 0), (B, 0), (C, 2),(D, 2)),
((A, 0), (B, 3), (C, 0), (D, 0)), ((A, 0), (B, 3), (C, 0), (D, 1)),
((A, 0), (B, 3), (C, 2), (D, 1)), ((A, 2), (B, 1), (C, 1), (D, 0)),
((A, 2), (B, 2), (C, 2), (D, 1)), ((A, 2), (B, 2), (C, 2), (D, 2))
((A, 2), (B, 2), (C, 2), (D, 3)), ((A, 0), (B, 0), (C, 0), (D, 3))}

It should be noted that the transport format combination ((A, 0), (B, 0), (C, 0), (D, 3)) is never used in the example of FIGS. 2 and 4. Thus, considering the TFCS set of transport format combinations indicated as (7), the different TFCSG parts determined by the partial transport format combinations corresponding to each global interval are given below:

For the global interval referenced as 402:

TFCSG{((A, 2))} =
{((A, 2), (B, 1), (C, 1), (D, 0)), ((A, 2), (B, 1), (C, 1), (D, 1)),
((A, 2), (B, 1), (C, 2), (D, 1)), ((A, 2), (B, 2), (C, 2), (D, 1))
((A, 2), (B, 2), (C, 2), (D, 2)), ((A, 2), (B, 2), (C, 2), (D, 3))}

For the global interval referenced as 404:

TFCSG{((A, 0), (B, 0), (C, 2))} = {((A, 0), (B, 0), (C, 2), (D, 1))
((A, 0), (B, 0), (C, 2), (D, 2))}

For the global interval referenced as 406:

TFCSG{((A, 0), (B, 0), (C, 0), (D, 2))}={((A, 0), (B, 0), (C, 0), (D, 2))}

For the global interval referenced as 408:

TFCSG{((A, 0), (B, 0), (C, 0), (D, 0))}={((A, 0), (B, 0), (C, 0), (D, 0))}

For the global interval referenced as 410:

TFCSG{((A, 0), (B, 3))} = {((A, 0), (B, 3), (C, 0), (D, 0)),
((A, 0), (B, 3), (C, 0), (D, 1)),
((A, 0), (B, 3), (C, 2), (D, 1))}

The scale factor $LFG_p$ corresponding to the global interval under consideration is then defined by the following formula (8):

$$LFG_p = \frac{N_{data}}{\max\limits_{j \in TFCSG(p)} \left( \sum\limits_{k \in MSB(j)} RM_{l(k)} \cdot \frac{X_k}{F_{l(k)}} \right)} \quad (8)$$

The rate matching ratios $RF_i$ are then defined individually, for the global interval under consideration, using the following formula (9):

$$RF_i = LFG_p \cdot RM_i \quad (9)$$

Figure 5:
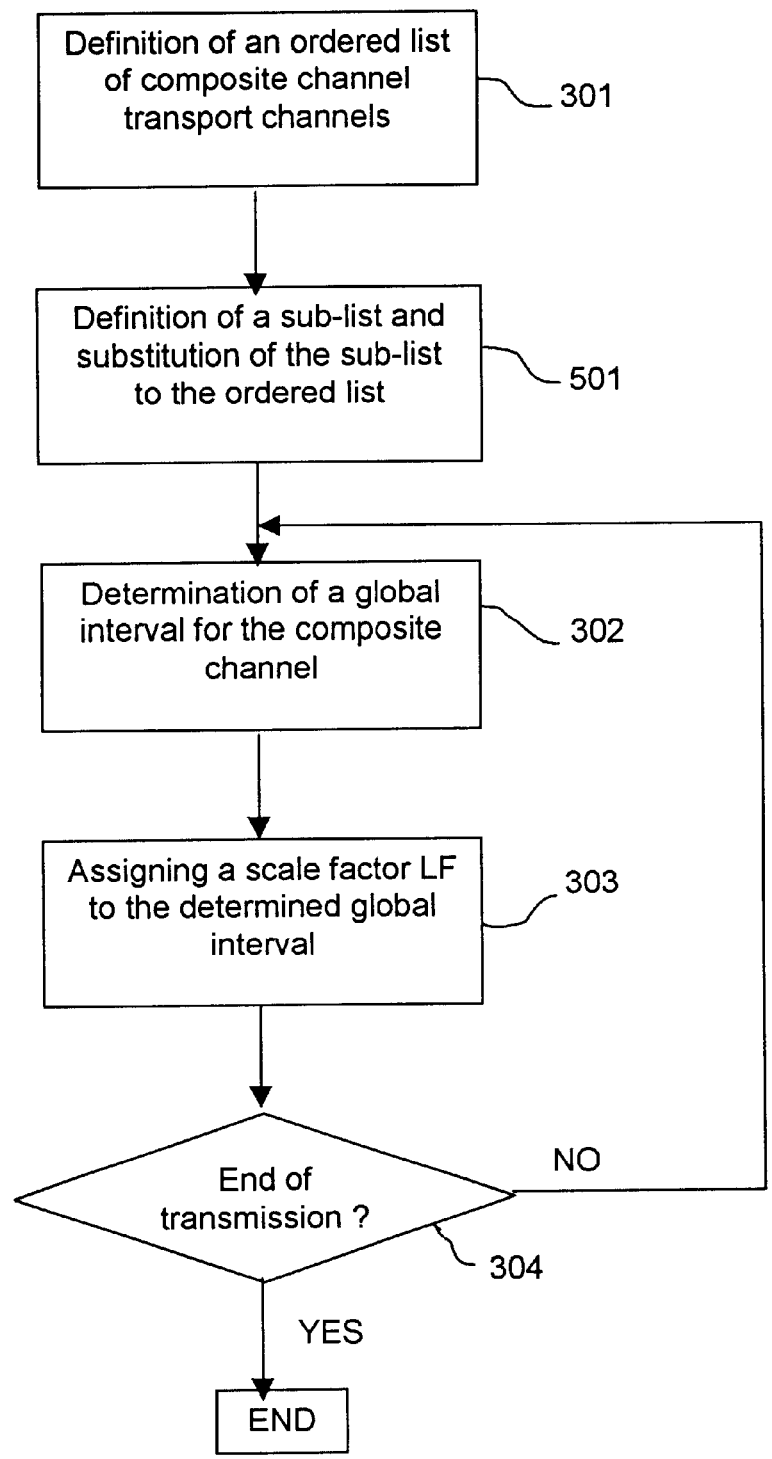
FIG. 5 is a simplified flow chart of a second embodiment of the rate matching method according to the invention.

In a second embodiment illustrated by FIG. 5, it is envisaged to establish a sub-list during a step referenced as 501. The flowchart of FIG. 5 is the same as that of FIG. 3 except for the fact that it now comprises step 501 of defining the sub-list and substituting this sub-list to the ordered list. This step is carried out after step 301 of defining the ordered list. The sub-list comprises the set of transport channels of the ordered list from the first transport channel to a given transport channel belonging to the composite channel. The sub-list therefore comprises part of the set of transport channels of the ordered list, the transport channels included in this sub-list are therefore also sequenced in the same order as that of the ordered list. It should be noted that when several transport channels have the same TTI interval duration, then the sequence in which they appear in the initial list before truncation is crucial. Indeed, depending on the sequence chosen, the list truncation can be performed so that some of these transport channels having the same TTI interval duration are maintained in the sub-list, and others are excluded from it.

E.g., in the list (A,B,C,D), the sub-lists (A,B,C) or (A) can be defined. When a sub-list is defined, the defined sub-list is substituted to the ordered list and the series of global intervals is determined through steps a), b), and c) described above. It is then found that for the sub-list (A,B,C), the global intervals 406 and 408 defined above are replaced by a single global interval 412 (determination indicated by the dot-and-dash line referenced as 414 in FIG. 4). For the sub-list (A), the global intervals 404, 406, 408 and 410 are replaced by a single global interval 416 (determination indicated by the dotted line referenced as 420 in FIG. 4).

The partial transport format combinations are then:

| Global interval reference | Partial combination of transport format(s) |
|---|---|
| 402 | ((A, 2) |
| 404 | ((A, 0), (B, 0), (C, 2)) |
| 412 | ((A, 0), (B, 0), (C, 0)) |
| 410 | ((A, 0), (B, 3)) |
| 416 | ((A, 0) |

The TFCSG parts determined by the partial transport format combinations for the global intervals 402, 404 and 410 have been defined previously.

For the global interval referenced as 412, the following is obtained:

TFCSG{((A, 0), (B, 0), (C, 0))} = {((A, 0), (B, 0), (C, 0), (D, 0)),
((A, 0), (B, 0), (C, 0), (D, 2))
((A, 0), (B, 0), (C, 0), (D, 3))}

Thus, for the TTI interval of transport channel D corresponding to the frame numbered 11, when the time under consideration corresponds to the start time of the third global interval referenced as 412, the transport format of transport channel D is not known by means of their partial transport format combination that is valid for the third global interval 412. The TFCSG set of the transport format combinations being known, the transport format of transport channel D can only, during the TTI interval of transport channel D corresponding to the frame referenced as 11, have the following three values 0, 2, and 3. Thus, for the third global interval referenced as 412, during the TTI interval of transport channel D corresponding to the frame referenced as 11, three construction alternatives can occur. A first alternative is e.g. that of recovering the partial transport format combination corresponding to ((A,0), (B,0), (C,0), (D,0)) represented in FIG. 2 or 4. A second alternative is e.g. that of recovering the partial transport format combination corresponding to ((A,O),(B,O),(C,O),(D,2)). A third alternative is e.g. that of recovering the partial transport format combination corresponding to ((A,O),(B,O),(C,O),(D,3)).

In the case of sub-list (A), for the global interval referenced as 416 the following is obtained:

TFCSG{((A, 0))} =
{(((A, 0), (B, 0), (C, 0), (D, 0)), ((A, 0), (B, 0), (C, 0), (D, 2)),
((A, 0), (B, 0), (C, 0), (D, 3)), ((A, 0), (B, 0), (C, 2), (D, 1)),
((A, 0), (B, 0), (C, 2), (D, 2)), ((A, 0), (B, 3), (C, 0), (D, 0)),
((A, 0), (B, 3), (C, 0), (D, 1)), ((A, 0), (B, 3), (C, 2), (D, 1))}

The performance of the rate matching method according to the invention in terms of minimizing DTX bits is illustrated by FIGS. 6 to 9.

For the sake of simplicity, FCS sequences are zero length (no error detection), channel encoding is transparent (no channel encoding), and the rate matching factors $RM_A$, $RM_B$, $RM_C$, and $RM_D$ are 1. Such sample composite channel does not correspond to a realistic usage. However, in such an example, the space occupied by each transport channel in the composite channel of FIGS. 6 to 9 is directly proportional to its payload of FIG. 2 according to a ratio equal to the scale factor LF, bringing out the impact of varying the scale factor LF and helping to better understand the invention.

Figure 6:
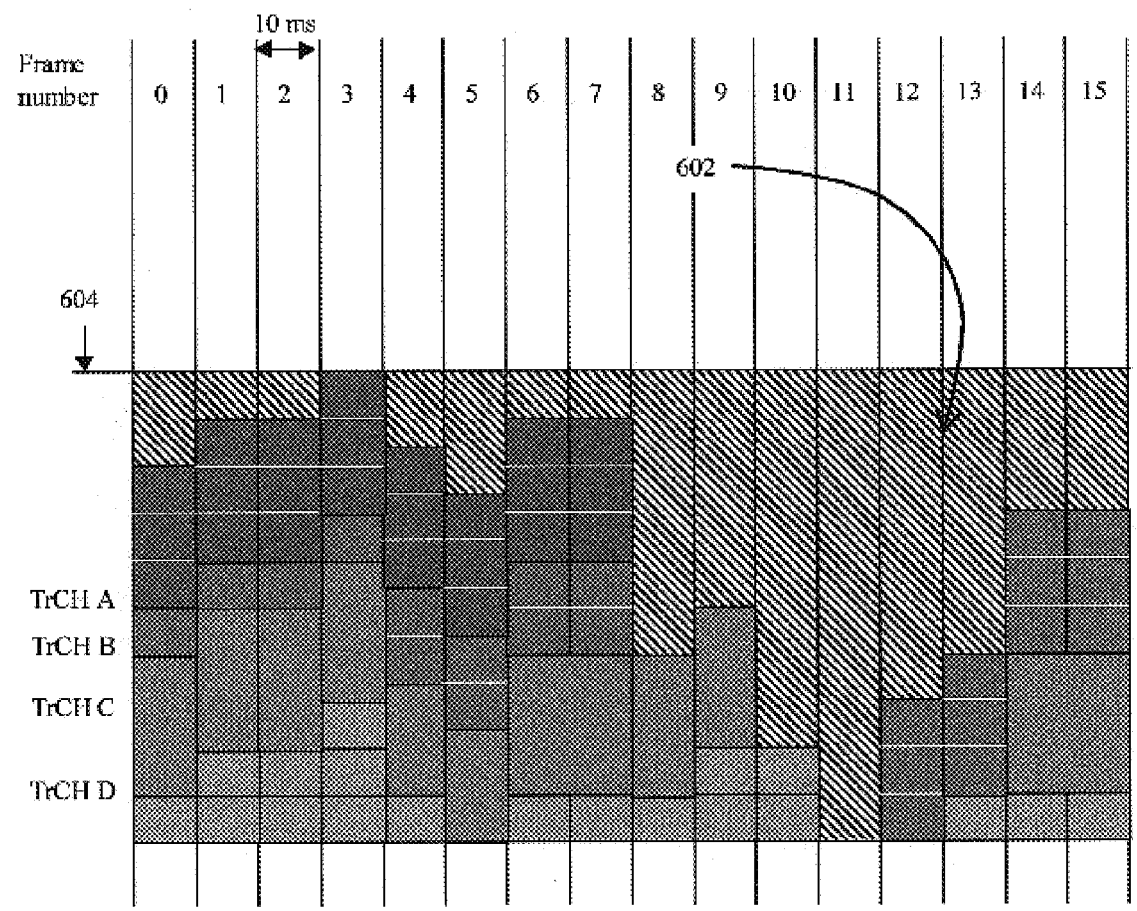
FIG. 6 illustrates a timing chart of a composite channel made of the four transport channels of FIG. 2, rate matched using the known technique.
Figure 7:
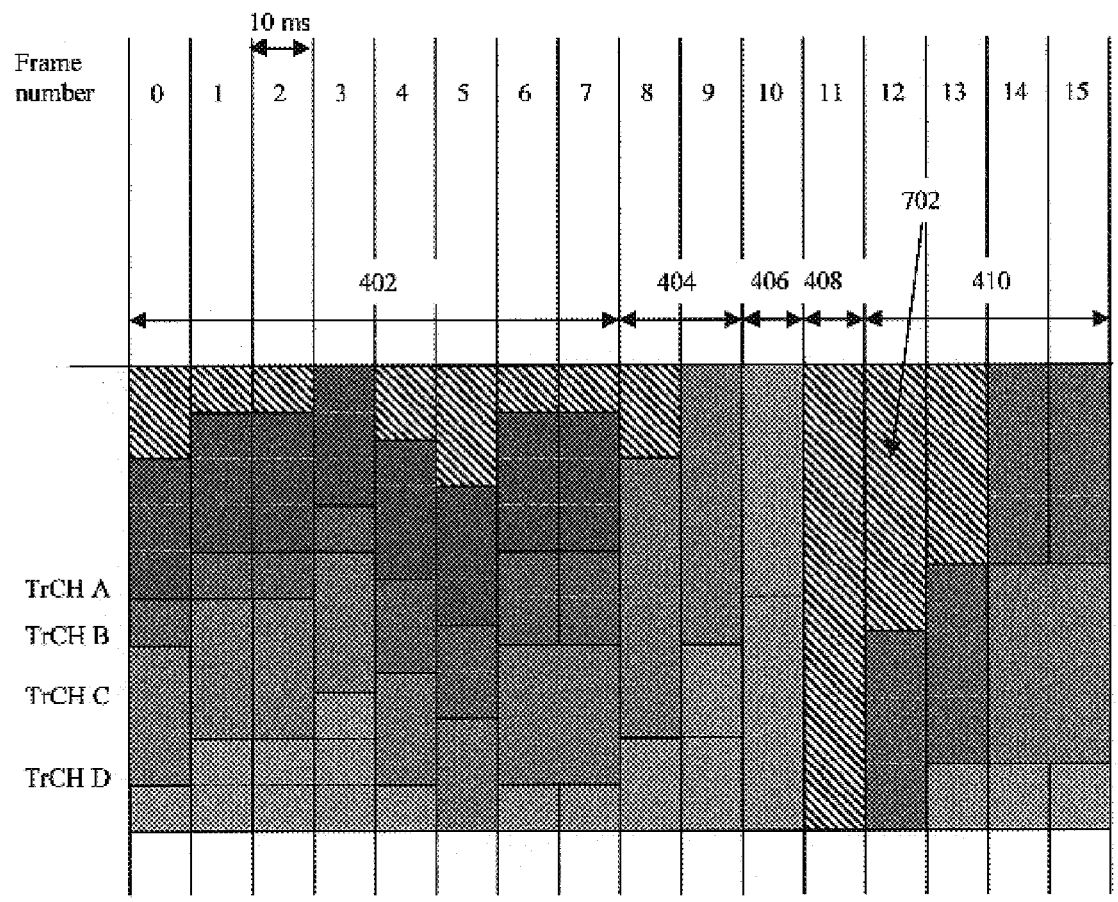
FIG. 7 illustrates a timing chart of a composite channel made of the four transport channels of FIG. 2 obtained when the first embodiment of the rate matching method according to the invention has been implemented.
Figure 8:
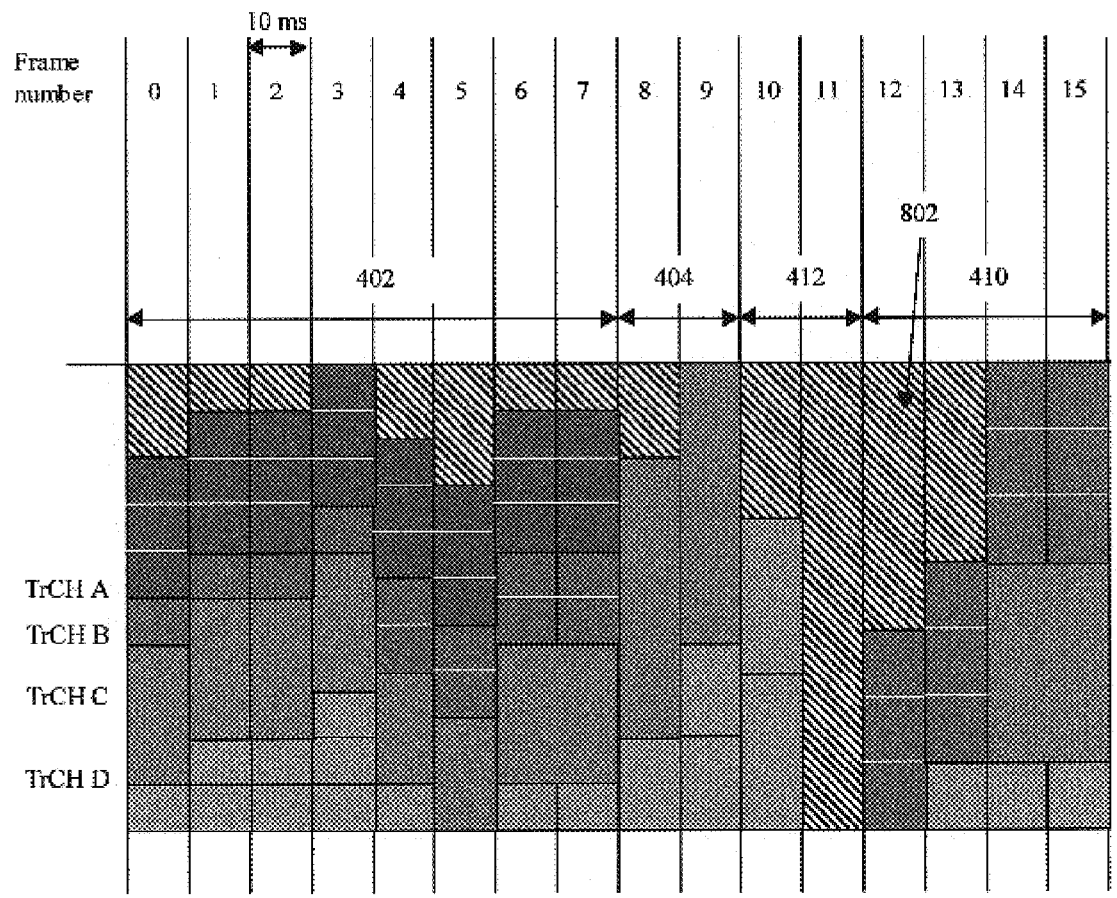
FIG. 8 illustrates a timing chart of a first composite channel made of the four transport channels of FIG. 2 obtained when the second embodiment of the rate matching method according to the invention has been implemented.
Figure 9:
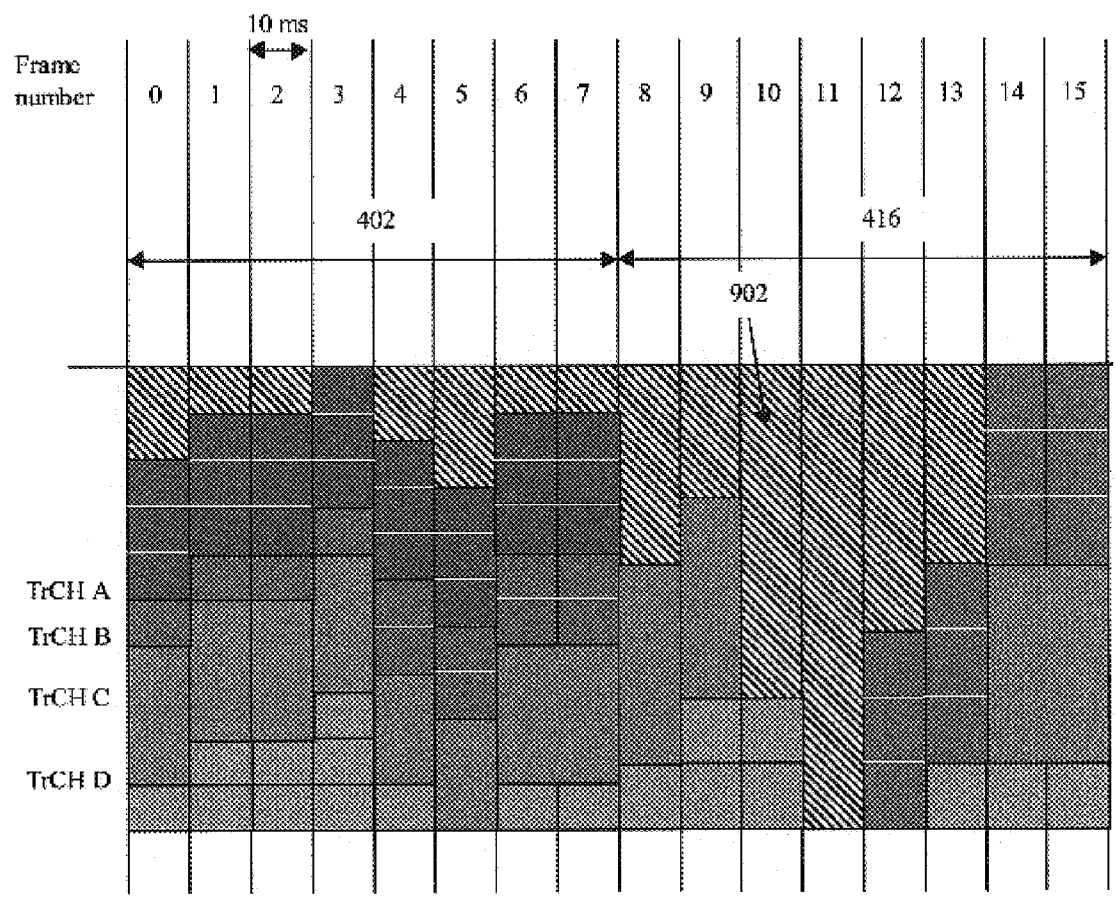
FIG. 9 illustrates a timing chart of a second composite channel made of the four transport channels of FIG. 2 obtained when the second embodiment of the rate matching method according to the invention has been implemented.

FIG. 6 shows a timing chart of a composite channel composed of the four transport channels A, B, C, D of FIG. 2 rate matched using the known prior art technique. FIGS. 7 to 9 show a timing chart of a composite channel composed of the four transport channels A, B, C, D of FIG. 2 rate matched using the inventive method.

The cross-hatched regions, referenced respectively as 602, 702, 802, and 902 in FIGS. 6, 7, 8, and 9, stand for the sufficient amount of inserted DTX symbols in the multiplexing frames in order to reach the size referenced as 604 corresponding to the available bit rate $N_{data}$.

In FIG. 6, the maximum bit rate of the composite channel is reached for the frame numbered 3. Indeed, formula (3) sets the scale factor LF at a value $LF_a$ based on the transport format combinations occurring in the frame numbered 3 of the example of FIG. 2. Indeed, it is in the frame numbered 3 that the transport format combination j occurs for which the normalized estimator of the composite channel $$\left( \sum_{k \in MSB(j)} RM_{I(k)} \cdot \frac{X_k}{F_{I(k)}} \right)$$

is at a maximum in the TFCS set given by item (7).

In FIG. 7, rate matching is performed according to the invention using the complete ordered list (A,B,C,D). Rate matching is then based on the global intervals 402, 404, 406, 408 and 410.

In FIG. 8, rate matching is performed according to the invention using the sub-list (A,B,C). Rate matching is then based on the global intervals 402, 404, 412 and 410.

In FIG. 9, rate matching is performed according to the invention using sub-list (A). Rate matching is then based on the global intervals 402 and 416.

For the sake of simplicity, the scale factor computation will only be detailed for FIG. 9. Indeed, there are only two global intervals and therefore only two scale factors to be calculated. In the first global interval 402, (corresponding to the frames numbered 0 to 7), rate matching is based on the rate matching ratios $RF_i$ defined by the following two formulas resulting respectively from formulas (9) and (10):

$$LFG_{((A,2))} = \frac{N_{data}}{\max_{j \in TFCSG(((A,2)))} \left( \sum_{k \in MSB(j)} RM_{I(k)} \cdot \frac{X_k}{F_{I(k)}} \right)}$$

$$RF_i = LFG_{((A,2))} \cdot RM_i$$

these formulas being defined for all transport channels i of the set {A, B, C, D} of composite channel transport channels.

For the second global interval 416, rate matching is based on other rate matching ratios $RF_i$ defined by the following two formulas resulting respectively from formulas (9) and (10):

$$LFG_{((A,0))} = \frac{N_{data}}{\max_{j \in TFCSG(((A,0)))} \left( \sum_{k \in MSB(j)} RM_{I(k)} \cdot \frac{X_k}{F_{I(k)}} \right)}$$

$$RF_i = LFG_{((A,0))} \cdot RM_i$$

In this FIG. 9, the composite channel reaches its maximum bit rate not only at the frame numbered 3, but also at the frames numbered 14 and 15. Indeed, the scale factor LF is set by the formula (9), firstly, for the frames numbered 0 to 7, at the value $LFG_{((A,2))}$ that is the same as value $LF_a$, and secondly, for the frames numbered 8 to 15, at the value $LFG_{((A,O))}$ greater than $LF_a$. Indeed, at frames 14 and 15, the transport format combinations j occur for which the composite channel normalized estimator $$\left( DN(j) = \sum_{k \in MSB(j)} RM_{I(k)} \cdot \frac{X_k}{F_{I(k)}} \right)$$

is at a maximum for the set referenced as TFCSG(((A,0))). Thus, for the frames numbered 8 to 15, according to the invention, the value of the scale factor LF is advantageously increased in comparison with that of the known solution. The number of DTX bits inserted after the rate matching operation is reduced and, accordingly, the composite channel transmit power that is indirectly proportional to the scale factor is also reduced.

It should be noted that the invention can be applied, without limitation, to a rate matching method wherein the rate matching factor $RM_i$ not only depends on the transport channel i, but also on the block type k to which rate matching is applied. All that is required is to replace in the formulas:

$RF_i$ by $RF_{i,k}$ $RM_i$ by $RM_{i,k}$ $RM_{I(k)}$ by $RM_{I(k),k}$

Such a dependence may have certain advantages. Indeed, e.g. when a turbo code is used to perform the step referenced as 108, then the larger the block thus coded, the more efficient the channel decoder, i.e. the same bit error rate BER can be provided for a lower Eb/I ratio. As a result, it is interesting that the rate matching factor $RM_i$ diminishes depending on the size of the rate matched block, wherein this size can be derived from its type k. The benefit obtained is that the amount of interference produced per transmitted symbol can be reduced, when the number of transmitted symbols is high.

What is claimed is:

1. A method for rate matching between at least two transport channels included within a composite channel, said method comprising at least one rate matching step for each transport channel (i), a rate matching ratio ($RF_i$) being applied to each transport channel (i), said rate matching ratio ($RF_i$) being equal to the product of a rate matching factor ($RM_i$) specific to said transport channel (i) and a scale factor (LF), said scale factor (LF) being common to the set of said transport channels of said composite channel, each of said transport channels being transmitted for at least one associated transmission time interval (TTI), each of said transmission time intervals (TTI) having a duration specific ($F_i$) to each (i) of said transport channels, at least two of said transport channels having transmission time channels (TTI) with distinct duration, characterized in that it comprises successive steps of:

defining (301), for said composite channel, a list of at least two transport channels ordered in descending order of the duration of their respective transmission time interval (TTI), said ordered list of transport channels being able to include at least one transport channel not transporting any data for at least one associated transmission time interval (TTI), determining (302), for said composite channel, at least two so-called global intervals for said ordered list of transport channels, said determined global intervals following each other in time, each of said determined global intervals corresponding:

either to a transmission time interval (TTI) associated with the first transport channel of said ordered list conveying data for said associated transmission time interval (TTI), or, in case none of the transport channels of said ordered list is transporting any data, to the smallest transmission time interval, assigning (303) a scale factor (LF) to each determined global interval, said scale factor being constant for the duration of each determined global interval, at least two assigned scale factors having distinct values ($LFG_{((A,0))}$, $LFG_{((A,2))}$) for at least two global intervals.

2. The method according to claim 1, zero energy contribution symbols (DTX) being inserted in said composite channel, the composite channel being transmitted on at least one physical channel, characterized in that, for minimizing the number of zero energy contribution symbols (DTX), the value of each of said assigned scale factors is determined according to the following formula:

$$LFG_p = \frac{N_{data}}{\max_{j \in TFCSG(p)} \left( \sum_{k \in MSB(j)} RM_{I(k)} \cdot \frac{X_k}{F_{I(k)}} \right)}$$

$N_{data}$ being said maximum bit rate supplied to said composite channel by said at least one physical channel;

k being a coded block type;

I(k) being a transport channel generating type k coded blocks;

$X_k$ being the number of symbols of said transport channel generating type k coded blocks before said rate matching step;

$F_{I(k)}$ being the duration of said transmission time interval of said transport channel generating type k coded blocks;

MSB(j) being the set of coded block types for the transport format combination j; and TFCSG(p) being the set of transport format combinations defining the same transport formats as a partial combination p of transport formats of the transport channels having transmission time intervals with duration lower than or equal to that of said determined global interval.

3. The method according to any of claims 1 and 2, characterized in that it comprises the successive steps of:

defining (501) a sub-list of at least one transport channel, said sub-list including the set of transport channels of the ordered list from the first transport channel to a given transport channel, said sub-list being ordered in descending order of the duration of the transmission time interval (TTI) associated with each of said at least one transport channel of the sub-list, and substituting (501) said sub-list to said ordered list, in order to reduce, for said composite channel, the number of scale factor values to be assigned to the set of said determined global intervals.

4. The method according to any of claims 1 to 3, characterized in that it is implemented within a telecommunication system using a CDMA type multiple access technology.

5. The method according to claim 4, characterized in that it is implemented from a radio access network comprising at least one base station to at least one mobile station of said telecommunication system.

6. The method according to claim 5, itself depending on claim 3, characterized in that said at least one transport channel of the sub-list is selected by said radio access network of said telecommunication system.

7. A device for rate matching between at least two transport channels included within a composite channel, said device comprising at least rate matching means for each transport channel (i), a rate matching ratio ($RF_i$) being applied to each transport channel (i), said rate matching ratio ($RF_i$) being equal to the product of a rate matching factor ($RM_i$) specific to said transport channel (i) and a scale factor (LF), said scale factor (LF) being common to the set of said transport channels of said composite channel, each of said transport channels being transmitted for at least one associated transmission time interval (TTI), each of said transmission time intervals (TTI) having a duration specific ($F_i$) to each (i) of said transport channels, at least two of said transport channels having transmission time intervals (TTI) of distinct duration, characterized in that it comprises:

means for defining, for said composite channel, a list of at least two transport channels ordered in descending order of the duration of their respective transmission time interval (TTI), said ordered list of transport channels being able to include at least one transport channel not transporting any data for at least one associated transmission time interval (TTI), means for determining, for said composite channel, at least two so-called global intervals for said ordered list of transport channels, said determined global intervals following each other in time, each of said determined global intervals corresponding:

either to the transmission time interval (TTI) associated with the first transport channel of said ordered list conveying data for said associated transmission time interval (TTI), or, in case none of the transport channels of said ordered list is transporting any data, to the smallest transmission time interval, means for assigning a scale factor (LF) to each determined global interval, said scale factor being constant for the duration of each determined global interval, at least two assigned scale factors having distinct values ($LFG_{((A,0))}$, $LFG_{((A,2))}$) for at least two global intervals.

8. A base station of a telecommunication system comprising transmission means of at least two transport channels, characterized in that it comprises a device according to claim 7.

9. A device for de-rate matching between at least two transport channels included within a composite channel, said device comprising at least de-rate matching means for each transport channel (i), a rate matching ratio ($RF_i$) being applied to each transport channel (i), said rate matching ratio ($RF_i$) being equal to the product of a rate matching factor ($RM_i$) specific to said transport channel (i) and a scale factor (LF), said scale factor (LF) being common to the set of said transport channels of said composite channel, each of said transport channels being transmitted for at least one associated transmission time interval (TTI), each of said transmission time intervals (TTI) having a duration specific ($F_i$) to each (i) of said transport channels, at least two of said transport channels having transmission time intervals (TTI) of distinct duration, characterized in that it comprises:

means for defining, for said composite channel, a list of at least two transport channels ordered in descending order of the duration of their respective transmission time interval (TTI), said ordered list of transport channels being able to include at least one transport channel not transporting any data for at least one associated transmission time interval (TTI), means for determining, for said composite channel, at least two so-called global intervals for said ordered list of transport channels, said determined global intervals following each other in time, each of said determined global intervals corresponding:

either to a transmission time interval (TTI) associated with the first transport channel of said ordered list conveying data for said associated transmission time interval (TTI), or, in case none of the transport channels of said ordered list is transporting any data, to the smallest transmission time interval, means for assigning a scale factor (LF) to each determined global interval, said scale factor (LF) being constant for the duration of each determined global interval, at least two assigned scale factors (LF) having distinct values ($LFG_{((A,0))}$, $LFG_{((A,2))}$) for at least two global intervals.

10. A mobile station of a telecommunication system comprising receiving means of at least two transport channels, characterized in that it comprises a device according to claim 9.

* * * * *

UNITED STATES PATENT AND TRADEMARK OFFICE
CERTIFICATE OF CORRECTION

PATENT NO. : 6,876,637 B1
DATED : April 5, 2005
INVENTOR(S) : Vincent A. Belaiche et al.

It is certified that error appears in the above-identified patent and that said Letters Patent is hereby corrected as shown below:

<u>Column 18,</u>
Line 51, change "according to any of Claims 1 or 3" to -- according to Claim 1 --.

Signed and Sealed this

Twentieth Day of December, 2005

JON W. DUDAS
*Director of the United States Patent and Trademark Office*